United States Patent
Hoffmann

(10) Patent No.: US 10,670,154 B2
(45) Date of Patent: Jun. 2, 2020

(54) ADJUSTABLE ORIFICE VALVE

(71) Applicant: AARON ENGINEERED PROCESS EQUIPMENT, INC., Bensenville, IL (US)

(72) Inventor: Jeffrey R. Hoffmann, Schaumburg, IL (US)

(73) Assignee: AARON ENGINEERED PROCESS EQUIPMENT, INC., Bensenville, IL (US)

( * ) Notice: Subject to any disclaimer, the term of this patent is extended or adjusted under 35 U.S.C. 154(b) by 136 days.

(21) Appl. No.: 16/001,024

(22) Filed: Jun. 6, 2018

(65) Prior Publication Data

US 2019/0376605 A1 Dec. 12, 2019

(51) Int. Cl.
  *F16K 3/314* (2006.01)
  *B65G 11/20* (2006.01)
  *F16K 3/02* (2006.01)
  *F16K 27/04* (2006.01)

(52) U.S. Cl.
  CPC ............ *F16K 3/314* (2013.01); *F16K 3/0209* (2013.01); *F16K 3/0218* (2013.01); *F16K 27/044* (2013.01); *B65G 11/206* (2013.01)

(58) Field of Classification Search
  CPC ...... F16K 3/314; F16K 3/0209; F16K 3/0218; F16K 27/044; B65G 11/206
  USPC .................................. 222/561; 251/326, 329
  See application file for complete search history.

(56) References Cited

U.S. PATENT DOCUMENTS

| | | | | |
|---|---|---|---|---|
| 2,749,940 A | * | 6/1956 | Bronson, II | F16K 3/029 137/613 |
| 3,066,831 A | * | 12/1962 | Lavere | B65D 88/68 222/239 |
| 3,252,630 A | * | 5/1966 | Berg | B65G 65/46 222/331 |
| 3,352,465 A | * | 11/1967 | Shapland | C21C 7/10 222/600 |
| 3,372,900 A | * | 3/1968 | Grove | F16K 27/105 251/205 |
| 3,387,819 A | * | 6/1968 | Grove | F16K 27/105 251/329 |
| 3,447,222 A | * | 6/1969 | Cousins | F16K 27/044 29/890.125 |
| 3,454,201 A | * | 7/1969 | Fichera | B22D 41/24 222/600 |
| 3,527,440 A | * | 9/1970 | Presslauer | F16K 27/044 251/187 |
| 3,587,945 A | * | 6/1971 | Lanatti | B22D 41/40 222/600 |

(Continued)

*Primary Examiner* — Patrick M. Buechner
*Assistant Examiner* — Michael J. Melaragno
(74) *Attorney, Agent, or Firm* — Barnes & Thornburg LLP; G. Peter Nichols

(57) ABSTRACT

A valve for controlling the flow of a solid material from an opening includes a gate having a first face adjacent the opening, a second face opposite the first, and an orifice. A support is disposed adjacent the second face of the gate and is configured so that the gate can move relative to the support from a first position permitting the material to flow from the opening through the orifice and a second position preventing the material from flowing through the opening. The support is movable in a direction substantially orthogonal to the first direction so that the distance from the first face to the opening can be varied.

5 Claims, 4 Drawing Sheets

(56) References Cited

U.S. PATENT DOCUMENTS

| | | | | |
|---|---|---|---|---|
| 3,765,579 | A * | 10/1973 | Cramer | B22D 41/40 222/600 |
| 3,926,406 | A * | 12/1975 | Hind | B22D 41/40 251/144 |
| 4,221,307 | A | 9/1980 | Peterson | |
| 4,697,723 | A * | 10/1987 | Fricker | B22D 41/40 222/512 |
| 4,938,250 | A | 7/1990 | Peterson | |
| 4,986,456 | A * | 1/1991 | Johanson | B65D 88/548 222/195 |
| 5,096,099 | A * | 3/1992 | Wiese | B65F 1/10 222/561 |
| 5,123,440 | A * | 6/1992 | Houston | B22D 41/24 137/375 |
| 5,938,175 | A | 8/1999 | Young et al. | |
| 6,276,573 | B1 * | 8/2001 | Tofuku | B22D 41/24 222/590 |
| 6,354,324 | B1 * | 3/2002 | Junier | F16K 27/044 137/315.27 |
| 6,588,729 | B1 * | 7/2003 | Kimpel | F16K 3/0227 251/214 |
| 6,698,624 | B2 * | 3/2004 | Ufheil | A47J 31/404 222/153.14 |
| 7,021,604 | B1 | 4/2006 | Werner et al. | |
| 7,163,191 | B2 | 1/2007 | Young et al. | |
| 7,290,566 | B1 | 11/2007 | Young et al. | |
| 7,464,913 | B2 | 12/2008 | Werner et al. | |
| 7,632,381 | B2 * | 12/2009 | Lah | C10B 25/10 175/220 |
| 8,186,648 | B2 * | 5/2012 | Sakai | F16L 23/003 137/13 |
| 8,399,599 | B2 | 3/2013 | Hackl et al. | |
| 8,733,734 | B2 * | 5/2014 | Nakamura | F16K 1/2085 251/174 |
| 2006/0237681 | A1 * | 10/2006 | Petersen | F16K 3/0272 251/326 |
| 2007/0114483 | A1 | 5/2007 | Young et al. | |
| 2008/0029546 | A1 * | 2/2008 | Schuld | B65D 88/26 222/185.1 |
| 2012/0233916 | A1 * | 9/2012 | Renyer | A01C 1/06 47/57.6 |

* cited by examiner

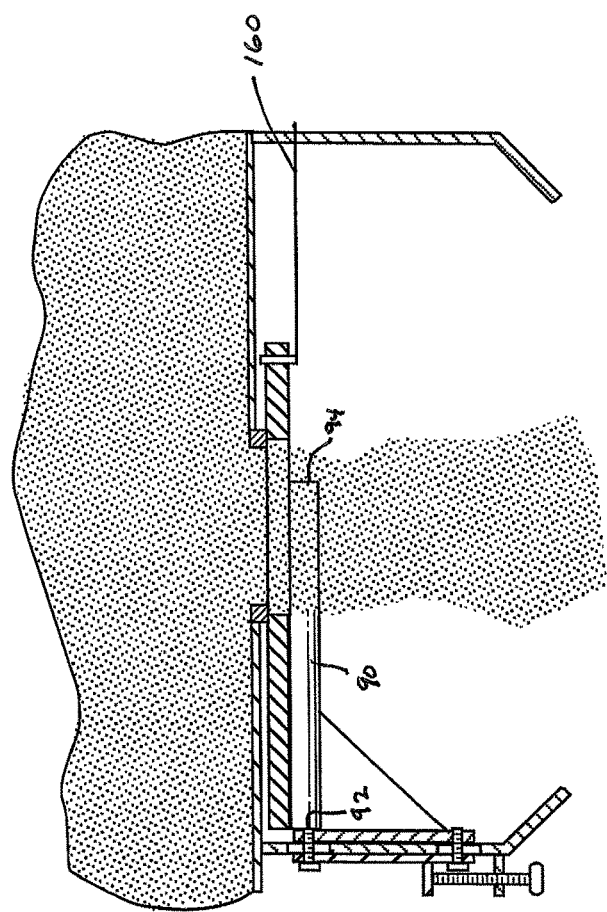
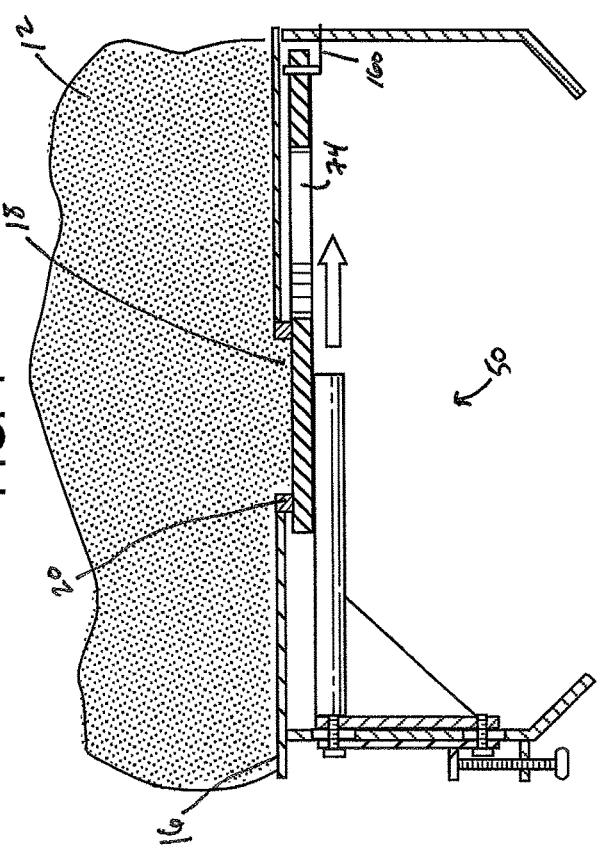

ADJUSTABLE ORIFICE VALVE

BACKGROUND

The invention relates generally to an adjustable orifice valve that minimizes product hang up and that may be quickly disassembled, cleaned, and returned to service.

One issue with known orifice valves, particularly those used in handling dry bulk materials, is that they wedge or pack material to the sides and ends of the body when the gate or valve opens. This can cause dry material build up that may lead to material cross contamination and difficulty in cleaning.

SUMMARY

The inventor created an orifice valve that minimizes product hang up and that can be quickly disassembled, cleaned, and returned to service. Specifically, the inventor created a specially constructed orifice valve for controlling the flow of a material from an opening.

The valve includes a gate that has a first face adjacent the opening and a second face opposite the first. The gate also includes an orifice, which when aligned with the opening, will permit material to flow from the opening through the orifice.

A support adjacent the second face of the gate is provided and is configured to move the gate in a first direction relative to the support from a first position permitting material to flow from the opening through the orifice and a second position preventing material from flowing through the opening.

Advantageously, the support is movable in a direction substantially orthogonal to the first direction. Accordingly, the gate can be moved to a position toward and away from the opening.

An actuator, such as, but not limited to, an air cylinder, pneumatic cylinder, electric motor, hand wheel, or hand crank, may be provided to move gate between an open and a closed position.

In one embodiment, the valve is used with an apparatus such as a dry material (solid particles) handling apparatus. An example of such an apparatus is a blender such as a ribbon blender, V blender, continuous processor, screw blender, double cone blender, and the like. The apparatus may be in the form of a tank configured to retain the dry material or solid particles and typically is provided with an opening at the bottom of the tank so that the material may be discharged from the tank.

In another embodiment, a tank is provided and configured to retain solid particles or dry material. The tank has a bottom with an opening through which the solid particles or dry material can be discharged.

The tank may have at least one wall that extends from the bottom of tank and oriented in a direction that is substantially orthogonal to the plane of the opening. A valve according to the present invention has a support that is movably mounted with respect to the at least one wall and has an end that extends from the at least one wall toward the opening. Because the support is movable with respect to the at least one wall, the support and the gate can be moved in a direction toward and away from the opening.

The valve also includes a gate with a first face that is adjacent the opening and a second face that is slidably supported by the support so the gate can move relative to the support from a first position permitting material to flow from the opening through the orifice and a second position preventing material from flowing through the opening.

Additional objects, advantages, and novel features of the invention will be set forth in part in the description which follows, and in part will become apparent to those skilled in the art upon examination of the following, or may be learned from practice of the invention.

BRIEF DESCRIPTION OF THE DRAWINGS

FIG. 4 is sectional view of the apparatus of FIG. 1 with a cross sectional view of the valve according to the present invention and which is shown in a closed position.

FIG. 5 is sectional view of the apparatus of FIG. 1 with a cross sectional view of the valve according to the present invention and which is shown in an open position.

DESCRIPTION

Figure 1:
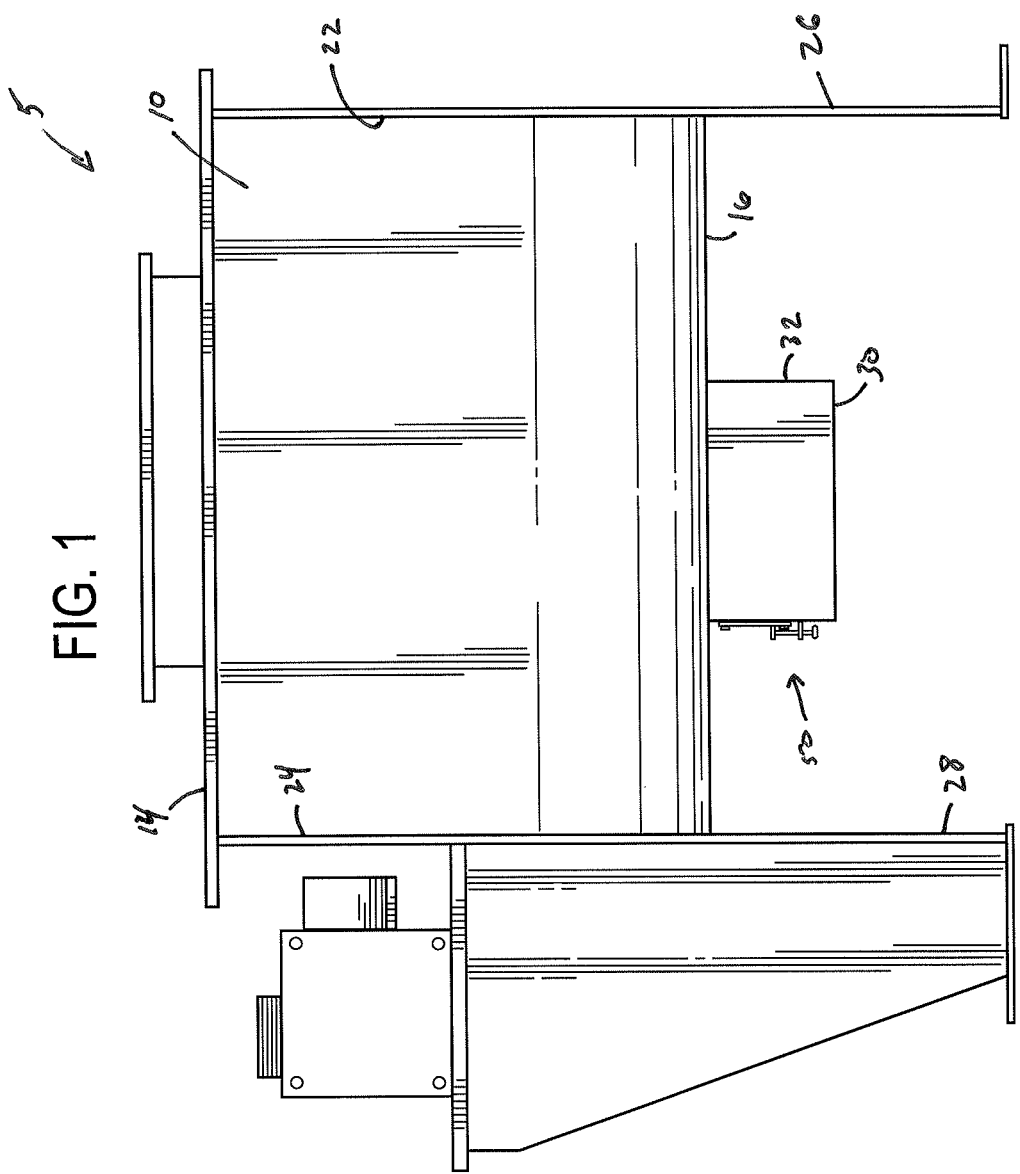
FIG. 1 is front plan view of an apparatus that includes a tank for holding a solid material and that includes a valve according to the present invention.

FIG. 1 shows a portion of the valve 50 according to the present invention in conjunction with an apparatus 5 in the form of a tank 10 constructed in a manner suitable to hold solid material 12 such as particles etc. One of skill will appreciate that the tank 10 may have any suitable shape even though it is shown as having a rounded bottom 16. The apparatus 5 is configured to contain solid material or particles 40 and may be, for example, a mixer suitable for mixing solid material. An example of such an apparatus 5 is a blender such as a ribbon blender, V blender, continuous processor, screw blender, double cone blender, and the like.

The tank 10 has a top 14, a bottom 16 with an opening 18 (not shown in FIG. 1), a first side 22 supported by a first support 26, and a second side 24 supported by a second support 28. The tank 10 will typically be supported in a manner so that the opening 18, which is generally provided on the bottom 16 of the tank 10, is spaced from a support surface such as a floor. The tank 10 may have a discharge chute 30 with at least one wall 32 (also referred to as the wall 32) that extends from the bottom 16 of the tank 10 and surrounds the opening 18.

The wall 32 has a first side 34, which may be considered the inside of the discharge chute 30, and a second side 36 opposite the first side 34 and defining an outside of the discharge chute 30. The wall 32 has at least one slot 38 (not shown in FIG. 1), and in one embodiment, has two spaced apart slots 38 and in another embodiment, has four spaced apart slots 38. The second side 36 of the wall 32 is provided with a flange 40 disposed orthogonally to the wall 32. The flange 40 has a hole 42 to receive an adjustment mechanism 152.

Figure 2:
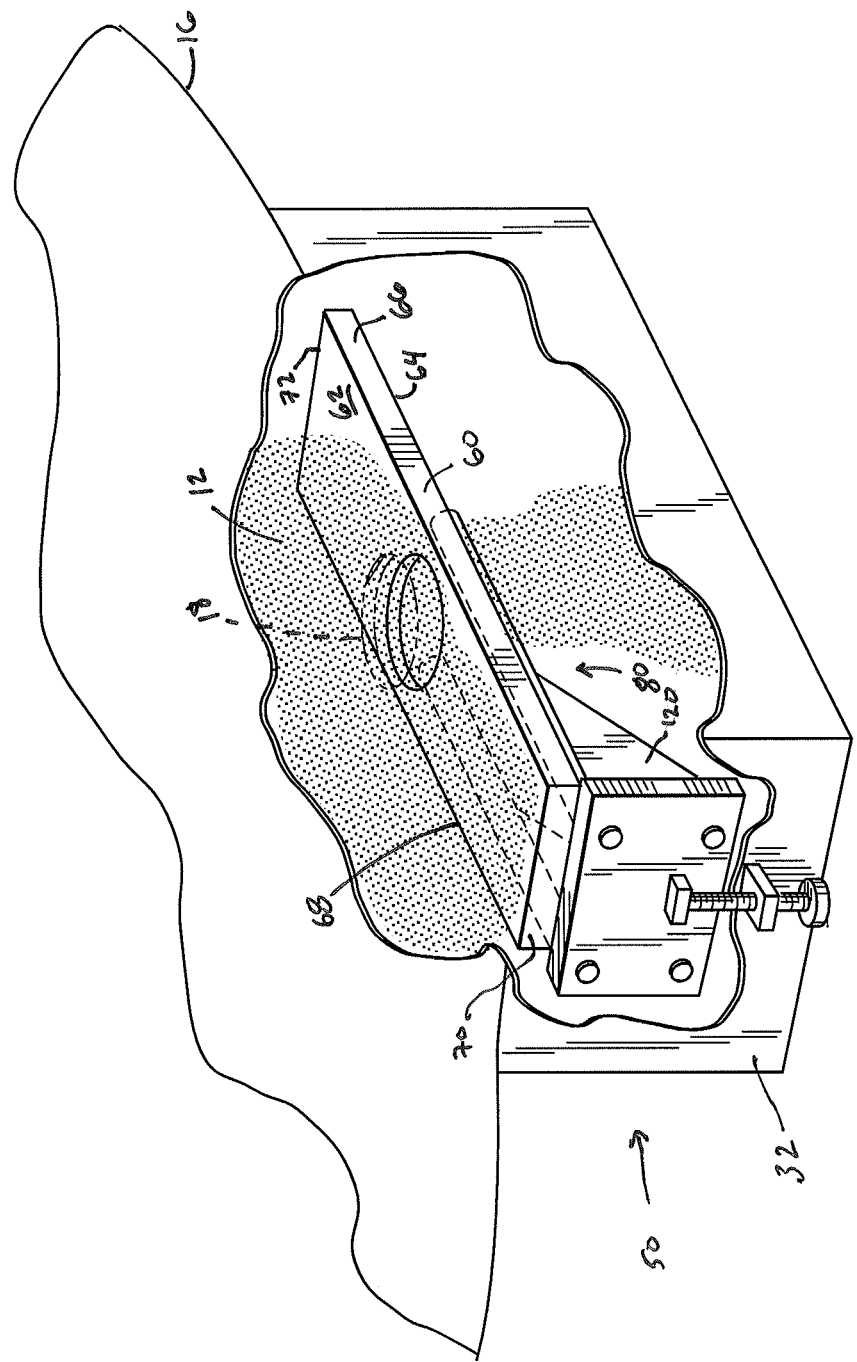
FIG. 2 is a perspective cut-away view of a portion of the apparatus shown in FIG. 1 to show the valve according to the present invention.
Figure 3:
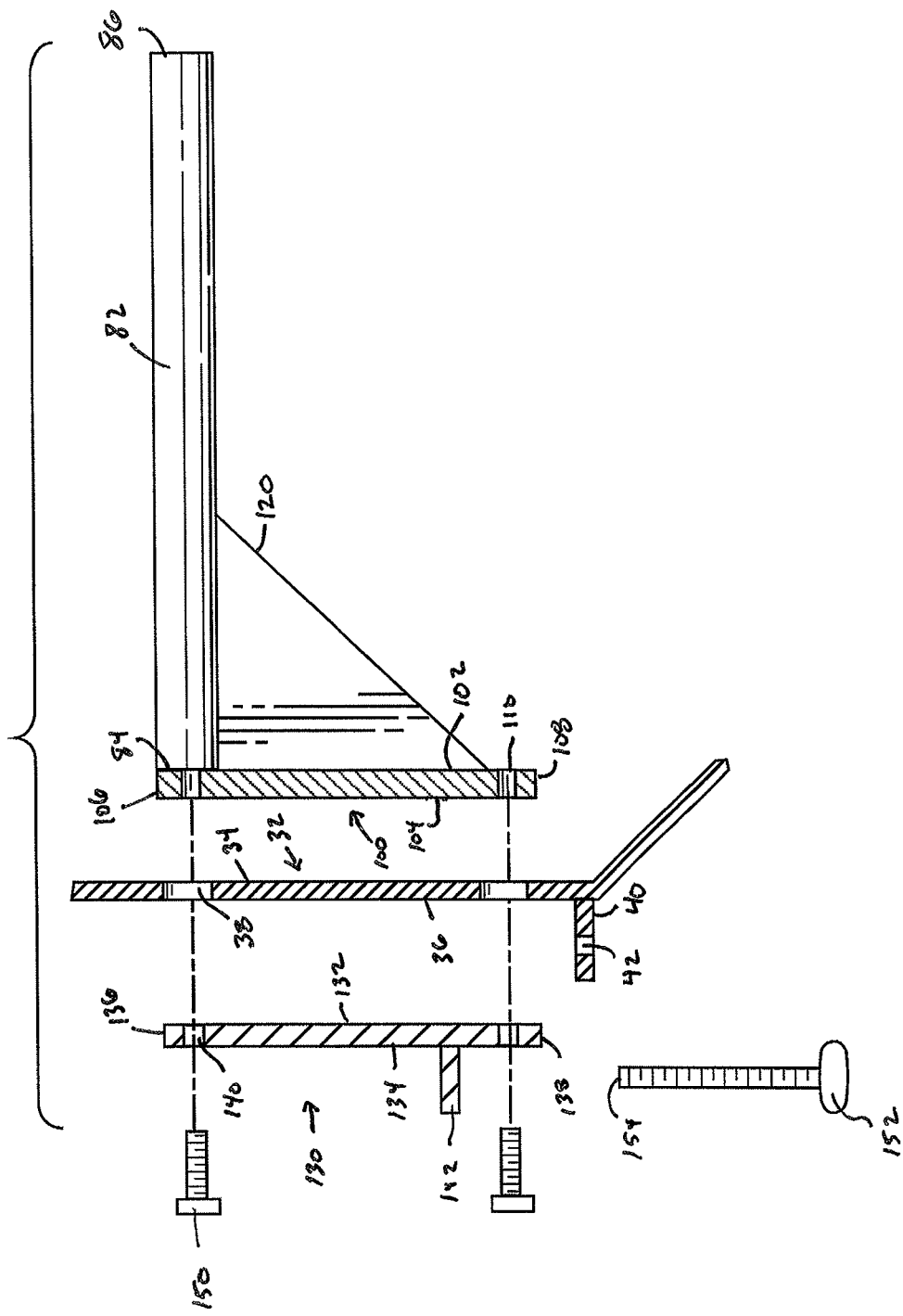
FIG. 3 is a cross sectional view of a portion of the valve according to the present invention.

Turning now to FIG. 2, a portion of the apparatus 5 is shown in a cut-away view to show the valve 50 according to the present invention. As previously mentioned, the bottom 16 of the tank 10 has an opening 18, which is shown as a circular opening. One of skill will appreciate that the opening 18 can have any suitable shape and size to permit the material 12 within the tank to flow from the tank. For ease of manufacturing and other considerations, the opening 18 will generally be circular and will have a diameter in the range of 2 to 24 inches depending on the size of the tank 10 and the material 12 disposed within the tank 10.

In one embodiment, a ring 20 is disposed about the periphery of the opening 18 to provide a mating surface, as will become evident from the following description. The ring 20 may be formed of any suitable material and is typically a metal that can be welded to the bottom 16 of the tank 10 about the periphery of the opening 18. The ring 20 may be machined or finished after it is installed to provide a smooth surface allowing the material 12 within the tank 10 to freely pass.

The valve 50 is movably mounted with respect to the wall 32 of the discharge chute 30 so that the distance between the opening 18 and the valve 50 can be adjusted. The valve 50 includes a gate 60, a support 80 for the gate 60, with the support 80 being connected to a connector plate 100, which is located on the first side 34 of the wall 32 of the discharge chute 30, and an adjustment plate 130 located on the second side 36 of the wall 32 of the discharge chute 30.

The gate 60 has a first face 62 adjacent the bottom 16 of the tank 10 and a second face 64 opposite the first face 62. An orifice 74 is provided between a first side 66, a second side 68, a first end 70 and a second end 72. The gate 60 is supported adjacent the bottom 16 of the tank 10 and, the gate 60 is moveable with respect to the wall 32 and with respect to the tank 10 so that, in one position, the orifice 74 is aligned with the opening 18 in the tank 10 to permit material 12 within the tank 10 to flow from the tank 10.

The gate 60 may be constructed of any suitable material. In one embodiment, the gate 60 is formed of a polymeric material so that the gate can freely move with respect to the support 80 and, in particular with respect to the ring 20. One of skill will appreciate that when the ring 20 is machined or finished to provide a smooth surface and when the gate 60 is formed from a polymeric material the gate will easily slide with respect to the ring 20. Suitable polymeric materials include polyethylene, polypropylene, polytetrafluoroethylene, high molecular weight polyethylene and/or polypropylene, ultra-high molecular weight polyethylene and/or polypropylene. Alternatively, the gate 60 may be formed of a metallic material that is coated with a resinous material such as polytetrafluoroethylene.

The orifice 74 is shown as being circular although it may have any suitable size and shape so long as it is complementary to the shape of the opening 18, i.e., it substantially complements the shape of the opening 18. Typically, the orifice 74 will be sized to be slightly larger than the opening 18 so that the material 12 within the tank 10 freely moves through the opening 18 and orifice 74 when the opening 18 and the orifice 74 are aligned. For example, the orifice 74 may be about 5-10% larger than the opening 18 in the relevant dimensions. In this regard, the relevant dimension for a circular opening is the diameter and the relevant dimension for a rectangular opening is the length and width of the rectangle. As an example, if the opening 18 is circular and has a diameter of about 6 inches, the orifice 74 will likewise be circular and will have a diameter of about 6.5 inches.

As noted above, the gate 60 is supported adjacent the bottom 16 of the tank 10. In particular, the valve 50 includes a support 80 on which the second face 64 of the gate 60 is supported in a manner so that the gate 60 can freely move or slide with respect to the support 80. In addition, the valve 50 is movable with respect to the tank 10 so that the distance between the opening 18 and the first face 62 of the gate 60 can be varied. Advantageously, the valve 50 can be moved so that, during operation, the first face 62 of the gate 60 contacts the bottom 18 of the tank 10 and, more specifically, contacts the ring 20 provided about the periphery of the opening 18. As a result, material 12 within the tank 10 that escapes is minimized and, at the same time, when it is desired to release the material 12 from the tank 10, the gate 60 easily moves or slides with respect to the support 80 to align the orifice 74 with the opening 18.

An actuator 160, such as an air cylinder, pneumatic cylinder, electric motor, hand wheel, hand crank, or other suitable mechanism may be provided to slidably move the gate 60.

In one embodiment, the support 80 includes a first arm 82 and a second arm 90 with the second arm 90 being spaced from the first arm 82. The first arm 82 is located near the first side 66 of the gate 60 and the second arm 90 is located near the second side 68 of the gate 60. The first and second arms 82, 90 are spaced from each other an amount such that there is a gap or space between the outer periphery of the orifice 74 and each of the arms 82, 90. In one embodiment, the arms 82, 90 are rounded or at least partially rounded in the area where they contact the second face 64 of the gate 60. As a result, the gate 60 is able to easily move or slide with respect to the support 80. And, because of the rounded shape of the arms 82, 90, material 12 flowing through the orifice 74 will be less likely to become trapped or hindered by the support 80.

The first arm 82 extends from the connector plate 100 toward the opening 18. The first arm 82 has a first end 84 connected to a first side 102 of the connector plate 100 and a second end 86 extending from the connector plate 100 toward the opening 18. Similarly, the second arm 90 extends from the connector plate 100 toward the opening 18. The second arm 90 has a first end 92 connected to a first side 102 of the connector plate 100 and a second end 94 extending from the connector plate 100 toward the opening 18. Generally, the first and second arms 82, 90 are located near a first end 106 of the connector plate 100, which is adjacent the bottom 16 of the tank 10.

A strut 120 connected to the connecting plate 100 and the support 80 may be provided to further structurally support the support 80. In one embodiment, a first strut 120*a* may be provided to support arm 82 and a second strut 120*b* may be provided to support arm 90.

The connector plate 100 has a second side 104 that is adjacent the first side 34 of the wall 32. The connector plate 100 is connected to an adjustment plate 130, which is located adjacent the second side 36 of the wall 32 such that the adjustment plate 130 and the connector plate 100 are simultaneously movable with respect to wall 32 and thus movable with respect to the tank 10 and the opening 18. The adjustment plate 130 has a first side 132 and a second side 134 and is disposed such that the first side 132 is adjacent the second side 36 of the wall 32.

In one embodiment, the connector plate 100 and the adjustment plate 130 have a similar shape and each are provided with at least one hole 110, 140 through which a connector 150 such as a screw may pass to couple the connector plate 100 and the adjustment plate 130 together. As a result, the connector plate 100 and the adjustment plate 130 will move simultaneously.

In one embodiment, the connector plate 100 is provided with two holes and in another embodiment the connector plate 100 is provided with four holes 110, with two being near the first end 106 and two being near the second end 108. Similarly, the adjustment plate 130 is provided with four holes 140, with two being the first end 136 and two being near the second end 138. Each hole 140 on the adjustment plate 130 is aligned with a respective hole 110 on the connector plate 100. A connector 150 such as a threaded screw passes through a respective hole 140 in the adjustment plate 130, through a respective slot 38 on the wall 32 of the discharge chute 30, and into a respective hole 110 in the connector plate 100. As a result, the adjustment plate 130, connector plate 100, and support 80 simultaneously move to cause the gate to move in a manner so that it is closer to or further from the opening 18.

One of skill will appreciate that the wall 32 will have at least the same number of slots 38 as the number of holes 140 in adjustment plate 130 through which the connector 150 will pass. In addition, the slots 38 on the wall 32 will be shaped in an elongate matter so that the adjustment plate 130, the connecting plate 100, and thus the gate 60 will be movable with respect to the wall 32 and with respect to the opening 18 so that the gate 60 can be moved closer to or farther from the opening 18. The slots 38 will be elongated in a direction that is perpendicular to the axis of the arms 82, 90.

A flange 142 extends from the second side 134 of the adjustment plate 130 and is generally parallel to the flange 40 extending from the second side 36 of the wall 32. The adjustment plate flange 142 extending from the second side 134 of the adjustment plate 130 is spaced from the second end 138 of the adjustment plate 130 and spaced from the flange 40 provided on the wall 32.

As noted before, the valve 50 includes an adjustment mechanism 152 that causes the adjustment plate 130, the connecting plate 100, and the gate 60 to simultaneously move in the same direction. In one embodiment, the adjustment mechanism 152 is in the form of a screw that which passes through the hole 42 (which may be threaded) in the flange 40 on the wall 32 so that an end 154 of the adjustment screw 152 contacts the flange 142 provided on the second side 134 of the adjustment plate 130.

One of skill will appreciate that movement of the screw 152 in one direction will cause the end of the screw 154 to contact the flange 142 on the adjustment plate 130 and further movement of the screw 154 in the same direction will cause the adjustment plate 130 to move with respect to the wall 32. As a result, the adjustment plate 130, the connecting plate 100, and the gate 60 will simultaneously move in a direction closer to the opening. On the other hand, movement of the adjustment mechanism 152 in the opposite direction will cause the adjustment plate 130, the connecting plate 100, and the gate 60 to simultaneously move in a direction further from the opening.

In operation, the gate 60 will be moved so that the first face 62 abuts or contacts the bottom 16 of the tank 10 or if a ring 20 is present, the first face 62 abuts or contacts the ring 20. In this position, the gate 60 can be moved from one position such that material within the apparatus 5 cannot pass through the opening 18, to another position, where the orifice 74 is aligned with the opening 18 so that material within the apparatus 5 can freely pass through the opening 18 and orifice 74.

If it is desired to clean the valve 50, the tank 10, or the tank opening 18 replace the gate 60, or for any other reason, the gate 60 can be moved so that the first face 62 is spaced from the opening 18 or ring 20, if provided. One of skill will appreciate that, advantageously, the inventive valve can be quickly disassembled or moved so that it can be cleaned and returned to service.

Although the inventive valve has been described in detail, the description of the above embodiments is only to help understand the inventive valve and its core concept. A person skilled in the art will readily appreciate that the above description is meant as an illustration of implementation of the principles this invention. This description is not intended to limit the scope or application of this invention in that the invention is susceptible to modification, variation, and change, without departing from the spirit of this invention, as defined in the following claims.

The invention claimed is:

1. An apparatus comprising:
a tank configured to retain solid particles;
an opening located at a bottom of the tank from which the solid particles can be discharged from the tank;
at least one wall extending from the bottom of the tank, disposed substantially orthogonal to and spaced from the opening, the at least one wall having a first side and a second side;
a valve that includes
a gate having a first face adjacent the opening and a second face opposite the first, the gate including an orifice; and
a support adjacent the second face of the gate, having a first end adjacent the first side of the at least one wall and a second end extending toward the opening, the support being movable with respect to the first side of the at least one wall, and configured to permit the gate to move in a first direction relative to the support from a first position permitting material to flow from the opening through the orifice and a second position preventing material from flowing through the opening;
wherein the support is movable in a direction substantially orthogonal to the first direction.

2. The apparatus according to claim 1 wherein the first end of the support is fixed to a connector plate that is moveably mounted with respect to the first side of the at least one wall.

3. The apparatus according to claim 2 further comprising an adjustment plate moveably mounted with respect to the second side of the at least one wall and connected to the connector plate such that the adjustment plate and the connector plate simultaneously move.

4. The apparatus according to claim 3 wherein the at least one wall has at least one slot configured to permit the adjustment plate and the connector plate to simultaneously move.

5. The apparatus according to claim 4 further comprising:
a wall flange extending from the second side of the at least one wall and including an adjustment mechanism;
an adjustment plate flange extending from the adjustment plate and configured such that a portion of the adjustment mechanism contacts the adjustment plate flange;
wherein movement of the adjustment mechanism effects movement of the valve in a direction toward or away from the bottom of the tank.

* * * * *